(12) United States Patent
Liu et al.

(10) Patent No.: US 8,982,059 B2
(45) Date of Patent: *Mar. 17, 2015

(54) TOUCH PANEL INCORPORATING CARBON NANOTUBE FILM

(75) Inventors: Liang Liu, Beijing (CN); Chen Feng, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 1136 days.

This patent is subject to a terminal disclaimer.

(21) Appl. No.: 12/884,671

(22) Filed: Sep. 17, 2010

(65) Prior Publication Data

US 2011/0134058 A1 Jun. 9, 2011

(30) Foreign Application Priority Data

Dec. 3, 2009 (CN) .......................... 2009 1 0250039

(51) Int. Cl.
| | |
|---|---|
| G06F 3/041 | (2006.01) |
| G06F 3/045 | (2006.01) |
| B82Y 30/00 | (2011.01) |
| B82Y 40/00 | (2011.01) |
| C01B 31/02 | (2006.01) |

(52) U.S. Cl.
CPC ................ *G06F 3/045* (2013.01); *B82Y 30/00* (2013.01); *B82Y 40/00* (2013.01); *C01B 31/0206* (2013.01)
USPC ....................................................... 345/173

(58) Field of Classification Search
USPC .......... 345/173–179; 178/18.01–18.11, 19.01
See application file for complete search history.

(56) References Cited

U.S. PATENT DOCUMENTS

| | | | |
|---|---|---|---|
| 7,045,108 B2 | 5/2006 | Jiang et al. | |
| 8,105,126 B2 | 1/2012 | Jiang et al. | |
| 8,519,976 B2 * | 8/2013 | Feng et al. | ..................... 345/174 |
| 2006/0274047 A1 * | 12/2006 | Spath et al. | ................... 345/173 |
| 2008/0248235 A1 | 10/2008 | Feng et al. | |
| 2008/0299031 A1 * | 12/2008 | Liu et al. | ..................... 423/447.3 |
| 2009/0046073 A1 * | 2/2009 | Pennington et al. | .......... 345/173 |
| 2009/0160795 A1 | 6/2009 | Jiang et al. | |
| 2009/0167708 A1 | 7/2009 | Jiang et al. | |
| 2009/0289203 A1 | 11/2009 | Jiang et al. | |

FOREIGN PATENT DOCUMENTS

| | | |
|---|---|---|
| CN | 101464764 | 6/2009 |
| CN | 101470558 | 7/2009 |
| CN | 101585533 | 11/2009 |
| TW | 200739402 | 10/2007 |
| TW | M345294 | 11/2008 |
| TW | 201003488 | 1/2010 |

* cited by examiner

*Primary Examiner* — Kent Chang
*Assistant Examiner* — Scott Au
(74) *Attorney, Agent, or Firm* — Novak Druce Connolly Bove + Quigg LLP

(57) ABSTRACT

A touch panel includes a first electrode plate having a first conductive layer and a second electrode plate including a second conductive layer opposite to the first conductive layer. At least one of the first conductive layer and the second conductive layer includes a carbon nanotube film. The carbon nanotube film includes a number of thin regions and at least one normal region having a number of successively oriented carbon nanotubes joined end-to-end by Van der Waals attractive force therebetween. The carbon nanotubes are substantially aligned along a same direction. The at least one normal region has a density of carbon nanotubes greater than that of the number of thin regions, and the number of thin regions form at least one row extending along the aligned direction of the carbon nanotubes of the at least one normal region.

20 Claims, 19 Drawing Sheets

TOUCH PANEL INCORPORATING CARBON NANOTUBE FILM

CROSS-REFERENCE TO RELATED APPLICATIONS

This application claims all benefits accruing under 35 U.S.C. §119 from China Patent Application No. 200910250039.8, filed on 2009 Dec. 3, in the China Intellectual Property Office, the disclosure of which is incorporated herein by reference.

BACKGROUND

1. Technical Field

The present disclosure relates to touch panels, and particularly to a touch panel incorporating carbon nanotube films having high light transmittance.

2. Description of Related Art

Various electronic apparatuses such as mobile phones, car navigation systems and the like are equipped with optically transparent touch panels applied over display devices such as liquid crystal panels. The electronic apparatus is operated when contact is made with the touch panel corresponding to elements appearing on the display device. A demand thus exists for such touch panels to maximize visibility and reliability in operation.

Resistive, capacitive, infrared, and surface acoustic wave touch panels have been developed. Resistive and capacitive touch panels are widely applied because of the higher accuracy and low cost of production.

A resistive or capacitive touch panel often includes a layer of indium tin oxide (ITO) as an optically transparent conductive layer. The ITO layer is generally formed by ion beam sputtering, a relatively complicated undertaking Furthermore, the ITO layer has poor wearability, low chemical endurance and uneven resistance over the entire area of the panel, as well as relatively low transparency. Such characteristics of the ITO layer can significantly impair sensitivity, accuracy, and brightness.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 19:
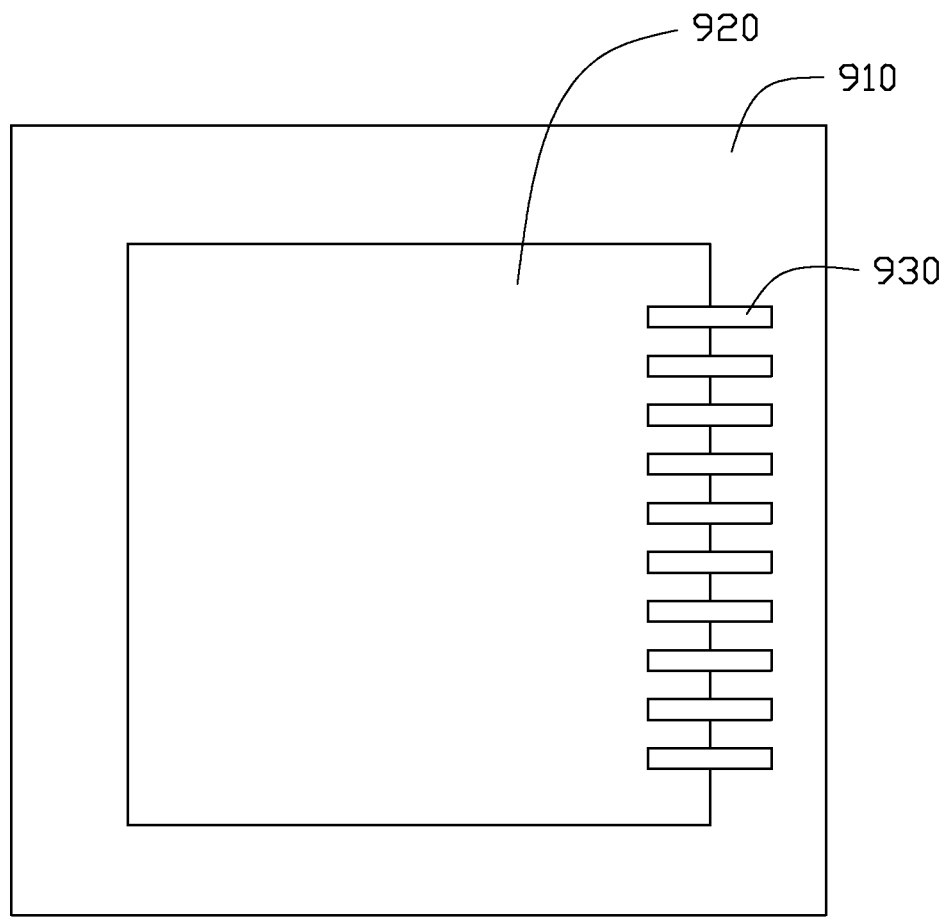
FIG. 19 is a schematic view of one embodiment of a touch panel.

One embodiment of a touch panel shown in FIG. 19 includes a substrate 910, a transparent conductive layer 920 disposed on the substrate 910, and a plurality of electrodes 930 electrically connected to the transparent conductive layer 920. The transparent conductive layer 920 can be a variable-density carbon nanotube film which has high light transmittance. Some examples of the variable-density carbon nanotube film are given below.

Figure 1:
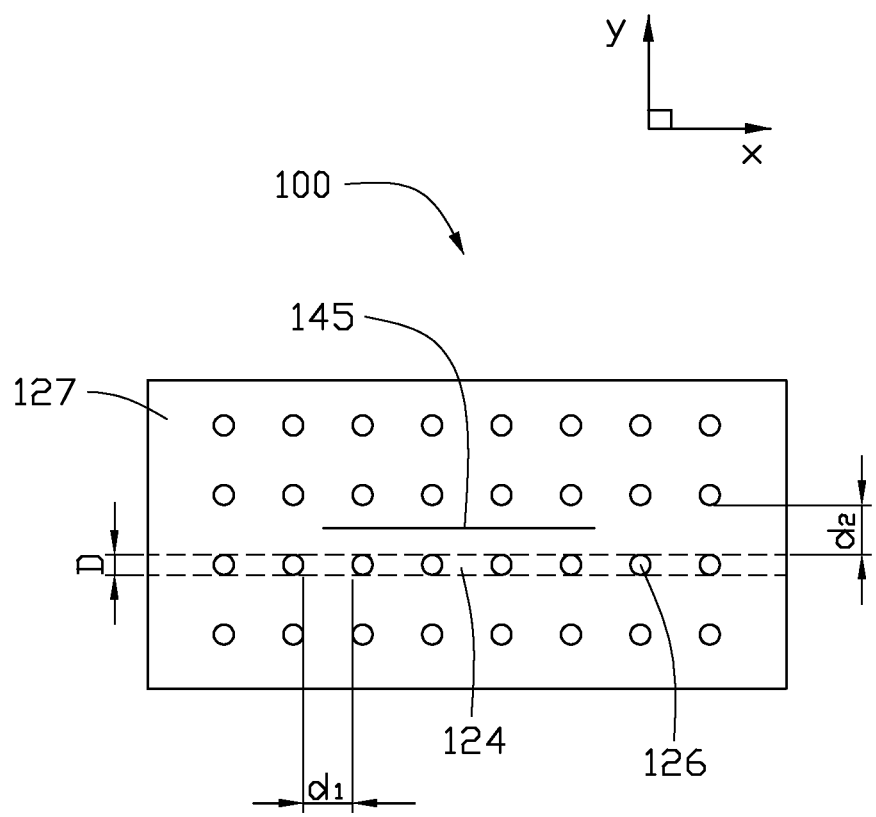
FIG. 1 shows a top view of one embodiment of a variable-density carbon nanotube film having a plurality of spaced thin regions.

Referring to FIG. 1, one embodiment of a variable-density carbon nanotube film 100 includes a number of successively oriented carbon nanotubes joined end-to-end by Van der Waals attractive force. The carbon nanotubes in the variable-density carbon nanotube film 100 can be substantially aligned in the first direction X as shown in FIG. 1. More specifically, the variable-density carbon nanotube film 100 includes a plurality of successively oriented carbon nanotube segments joined end-to-end by Van der Waals attractive force therebetween. Each carbon nanotube segment includes a plurality of carbon nanotubes 145 substantially parallel to each other, and joined by Van der Waals attractive force therebetween.

Figure 2:
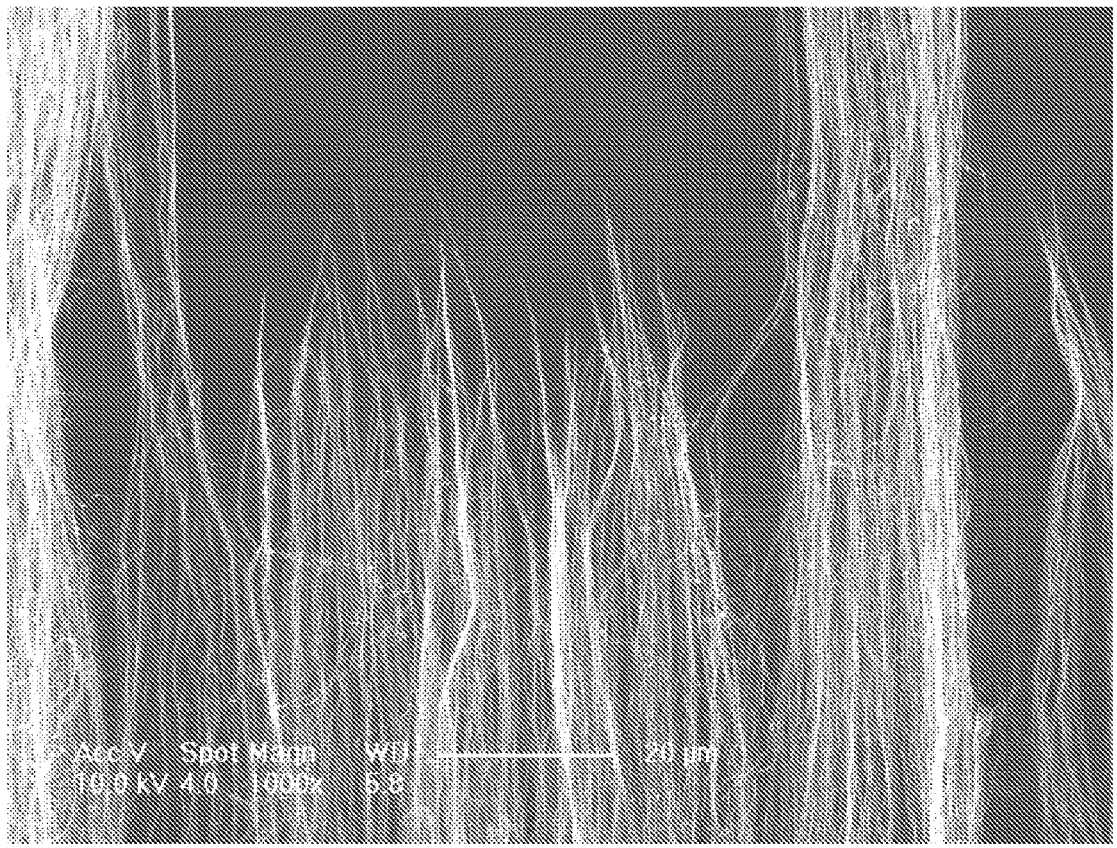
FIG. 2 is a Scanning Electron Microscope (SEM) image of an embodiment one of a thin region.

The variable-density carbon nanotube film 100 can be divided into a number of thin regions 126 and a normal region 127. Also referring to FIG. 2, the thin regions 126 have a density of carbon nanotubes less than that of the normal region 127. In one embodiment, the density of the thin regions 126 can range from about 0% to about 80% of the density of the normal region 127. In one embodiment, the density of the thin regions 126 can range from about 0% to about 50% of the density of the normal region 127. If the density of the thin regions 126 is 0% of the density of the normal region 127, the thin regions 126 can be openings such as holes and slots defined through the variable-density carbon nanotube film 100.

The thin regions 126 can be spaced arranged in the normal region 127 in the form of a number of rows 124 extending along the first direction X. In each of the rows 124, the thin regions 126 can be spaced from adjacent ones by a distance $d_1$. The distance $d_1$ can be less than 100 micrometers. The rows 124 are spaced from one another a distance $d_2$ in the second direction Y as shown in FIG. 1. The distance $d_2$ can be greater than the distance $d_1$. The distance $d_2$ can range from about 1 micrometer to about 5 millimeters (e.g. from about 10 micrometers to about 100 micrometers). The distance $d_2$ between adjacent rows 124 can be the same or different.

The shape of the thin regions 126 is not limited, and can be round or other shapes according to actual applications. If the shape of the thin regions 126 is round, the diameter D of the thin regions 126 can range from about 1 micrometer to about 5 millimeters (e.g. from about 10 micrometers to about 100 micrometers). Further, the number of the thin regions 126 in each row 124 can be substantially same.

In the embodiment shown in FIG. 1, the rows 124 can be arranged substantially parallel in the normal region 127 at uniform intervals along the second direction Y. The distance $d_2$ can be about 20 micrometers. The thin regions 126 are round, and the diameter D of the thin regions 126 can be about 20 micrometers. The thin regions 126 in each of the rows 124 align with corresponding thin regions 126 in adjacent rows 124 to form a number of columns in the second direction Y. Alternatively, as shown in FIG. 3, the thin regions 126 of every two adjacent rows 124 can be arranged in staggered formation.

Figure 3:
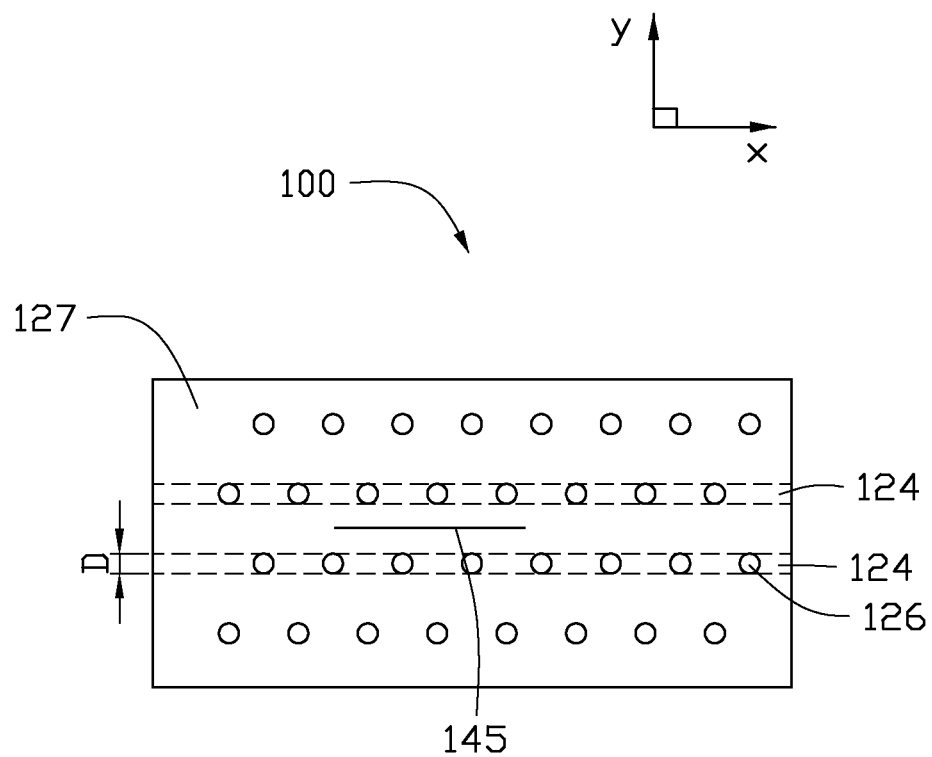
FIG. 3 is similar to FIG. 1, except that thin regions of every two adjacent rows are arranged in staggered formation.

As shown in FIG. 1 and FIG. 3, there are carbon nanotubes 145 between every two adjacent rows 124 that are joined end-to-end. The carbon nanotubes 145 between the every two adjacent rows 124 can define at least one continuous electrically conductive path along the first direction X. Thus, the electrical conductivity of the variable-density carbon nanotube film 100 in the first direction X will not be affected greatly by the presence of the thin regions 126. However, the presence of the thin regions 126 greatly reduces the electrical conductivity of the variable-density carbon nanotube film 100 in the second direction Y, because there are less carbon nanotubes electrically connected in the second direction Y and because the carbon nanotubes are substantially aligned in the first direction X. In other words, the presence of the thin regions 126 can increase the difference in the electrical conductivity of the variable-density carbon nanotube film 100 between the first direction X and the second direction Y.

As described above, because the thin regions 126 have a density less than that of the normal region 127, the light transmittance of the thin regions 126 can be about 10% to about 20% greater than that of the normal region 127 if the density of the thin regions 126 ranges from about 0% to about 50% of the density of the normal region 127. If the thin regions 126 are in the form of holes or openings, the light transmittance of the thin regions 126 can be much greater than that of the normal region 127. Thus, the light transmittance of the whole variable-density carbon nanotube film 100 can be improved.

Figure 4:
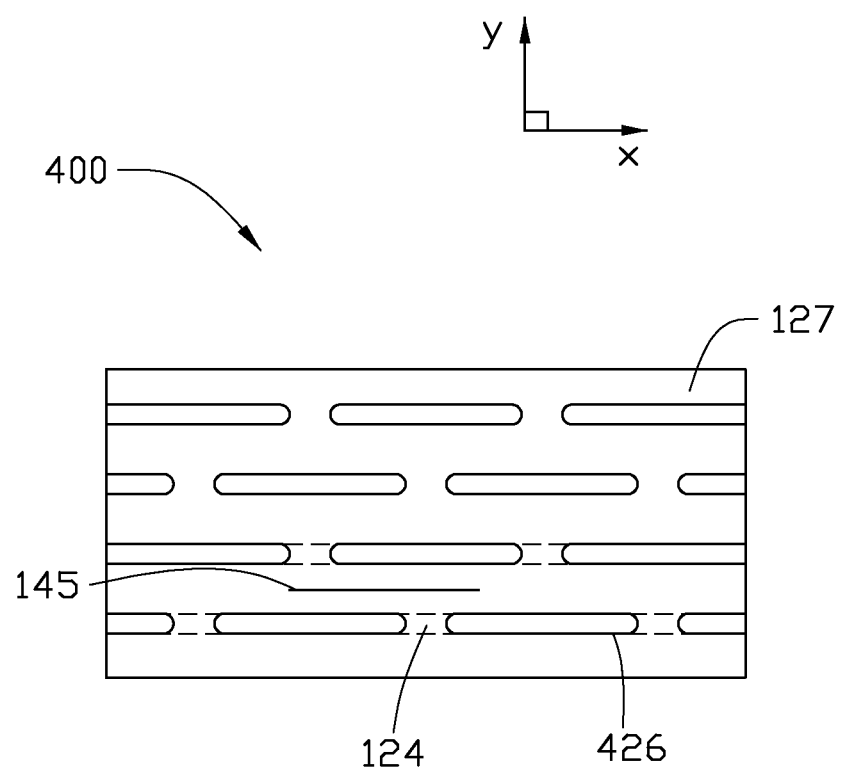
FIG. 4 is similar to FIG. 1, except that thin regions each have a strip shape.

Referring to FIG. 4, one embodiment of a variable-density carbon nanotube film 400 is shown. The variable-density carbon nanotube film 400 is similar to the variable-density carbon nanotube film 100 except that the thin regions 426 each have a strip shape. In each rows 124, a number of spaced thin regions 426 are arranged. Each of the thin regions 426 has a lengthwise direction which is substantially parallel to the first direction X. The length of the thin region 426 is greater than the width of the thin region 426. The width of the thin region 426 can range from about 1 micrometer to about 5 millimeters (e.g. from about 10 micrometers to about 100 micrometers).

Figure 5:
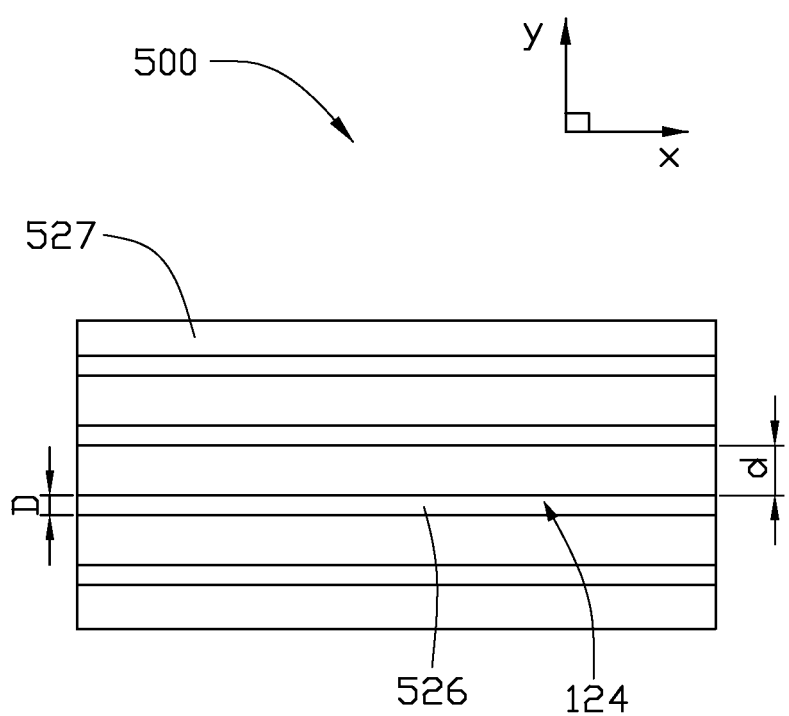
FIG. 5 is similar to FIG. 4, except that thin regions each extend across the entire variable-density carbon nanotube film.

Referring to FIG. 5, one embodiment of a variable-density carbon nanotube film 500 is shown. The variable-density carbon nanotube film 500 is similar to the variable-density carbon nanotube film 400 except that each row 124 is a thin region 526 which has a long strip shape and extends across the entire variable-density carbon nanotube film 500 along the first direction X. Because each of the thin regions 526 extends across the entire variable-density carbon nanotube film 500 along the first direction X, a number of normal regions 527 are defined between adjacent thin regions 526. The thin regions 526 and the normal regions 527 are alternatively arranged along the second direction Y. In the embodiment shown in FIG. 5, the electrical conductivity of the variable-density carbon nanotube film 500 in the second direction Y can be further reduced. Thus, the difference in the electrical conductivity of the variable-density carbon nanotube film 500 in the first direction X and the second direction Y can be further increased.

Figure 6:
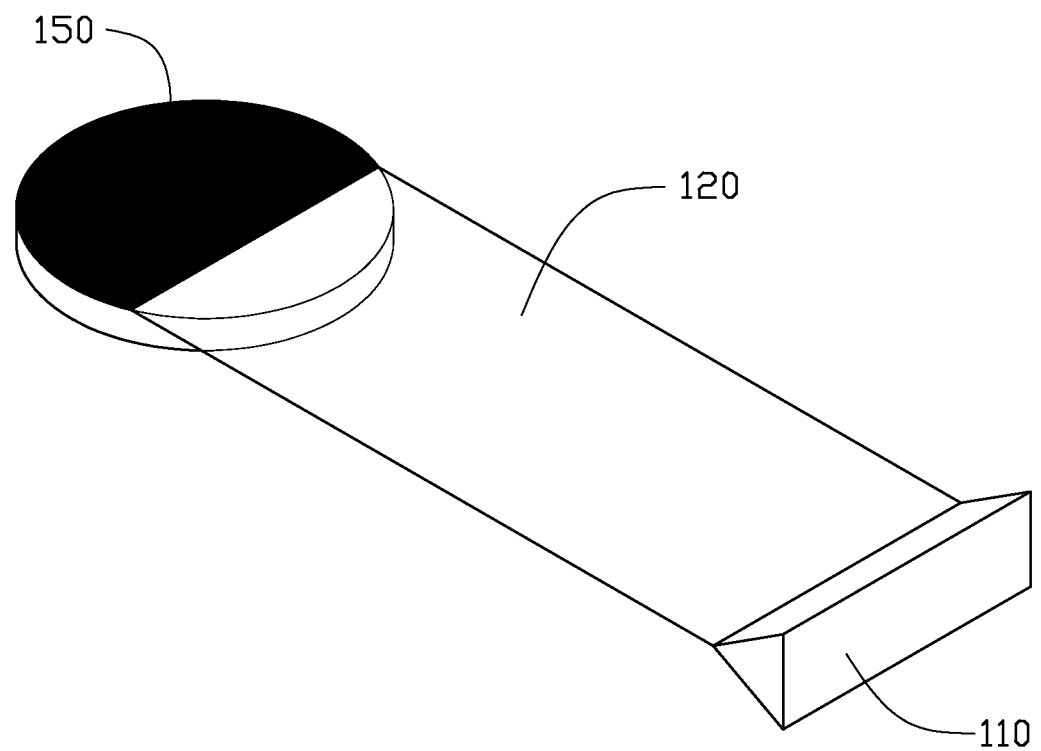
FIG. 6 is a schematic structural view of one embodiment of a process of fabricating a drawn carbon nanotube film.

One embodiment of a method for fabricating the above described variable-density carbon nanotube films 100/400/500 includes the steps of:
(a) providing a drawn carbon nanotube film 120 comprising of a number of carbon nanotubes aligned along a same direction (FIG. 6); in some embodiments, the drawn carbon nanotube film 120 consisted of carbon nanotubes; and
(b) forming a number of thin regions 126/426/526 in the drawn carbon nanotube film 120 along the aligned direction of the carbon nanotubes.

In step (a), the drawn carbon nanotube film 120 can be formed by drawing a film from a carbon nanotube array 150 capable of having a film drawn therefrom. The drawn carbon nanotube film 120 can be fabricated according to the following steps of:
(a-1) providing a carbon nanotube array 150; and
(a-2) drawing a drawn carbon nanotube film 120 from the carbon nanotube array 150.

In step (a-1), the carbon nanotube array 150 can be a super-aligned array of carbon nanotubes, which can be formed by chemical vapor deposition method or other methods. Examples of a method for fabricating a super-aligned array of carbon nanotubes are taught by US PGPub. 20080248235A1 to Feng et al. Carbon nanotubes of the carbon nanotube array 150 can be substantially parallel to each other. The carbon nanotubes can be selected from single-walled, double-walled, and/or multi-walled carbon nanotubes. Diameters of the carbon nanotubes can range from about 1 nanometer to about 50 nanometers. Lengths of the carbon nanotubes can range from about 50 nanometers to about 5 millimeters. In one embodiment, the lengths of the carbon nanotubes can range from about 100 micrometers to about 900 micrometers.

Step (a-2) includes the sub-steps of:
(a-21) selecting a plurality of carbon nanotube segments having a predetermined width from the carbon nanotube array 150; and
(a-22) pulling the carbon nanotube segments at an even/uniform speed to form the continuous drawn carbon nanotube film 120.

In step (a-21), the carbon nanotube segments having a predetermined width, can be selected by using an adhesive tape as a tool 110 to contact the carbon nanotube array 150. In step (a-22), the pulling direction is substantially perpendicular to the growing direction of the carbon nanotube array 150. During the pulling process, as the initial carbon nanotube segments are drawn out, other carbon nanotube segments are also drawn out end to end, due to the Van der Waals attractive force between the ends of adjacent segments. The drawn carbon nanotube film 120 produced in such manner can be selectively formed having a predetermined width.

Figure 7:
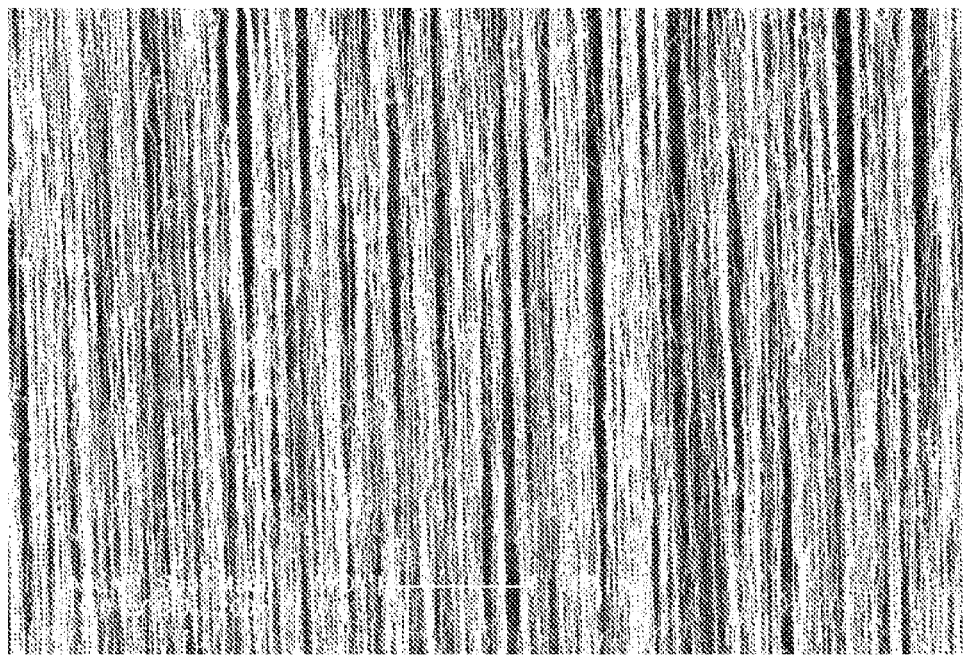
FIG. 7 shows an SEM image of the drawn carbon nanotube film.

Referring to FIG. 7, the drawn carbon nanotube film 120 includes a plurality of carbon nanotubes that can be arranged substantially parallel to a surface of the drawn carbon nanotube film 120. A large number of the carbon nanotubes in the drawn carbon nanotube film 120 can be oriented along a preferred orientation, meaning that a large number of the carbon nanotubes in the drawn carbon nanotube film 120 are arranged substantially along the same direction. An end of one carbon nanotube is joined to another end of an adjacent carbon nanotube arranged substantially along the same direction, by Van der Waals attractive force. A small number of the carbon nanotubes are randomly arranged in the drawn carbon nanotube film 120, and has a small if not negligible effect on the larger number of the carbon nanotubes in the drawn carbon nanotube film 120 arranged substantially along the same direction. The drawn carbon nanotube film 120 is capable of forming a free-standing structure. The term "free-standing structure" can be defined as a structure that does not have to be supported by a substrate. For example, a free standing structure can sustain its weight when hoisted by a portion thereof without any significant damage to its structural integrity. So, if the drawn carbon nanotube film 120 is placed between two separate supporters, a portion of the drawn carbon nanotube film 120, not in contact with the two supporters, would be suspended between the two supporters and yet maintain film structural integrity. The free-standing structure of the drawn carbon nanotube film 120 is realized by the successive carbon nanotubes joined end to end by Van der Waals attractive force.

It can be appreciated that some variation can occur in the orientation of the carbon nanotubes in the drawn carbon nanotube film 120 as can be seen in FIG. 7. Microscopically, the carbon nanotubes oriented substantially along the same direction may not be perfectly aligned in a straight line, and some curve portions may exist. It can be understood that some carbon nanotubes located substantially side by side and oriented along the same direction being contact with each other can not be excluded.

Figure 8:
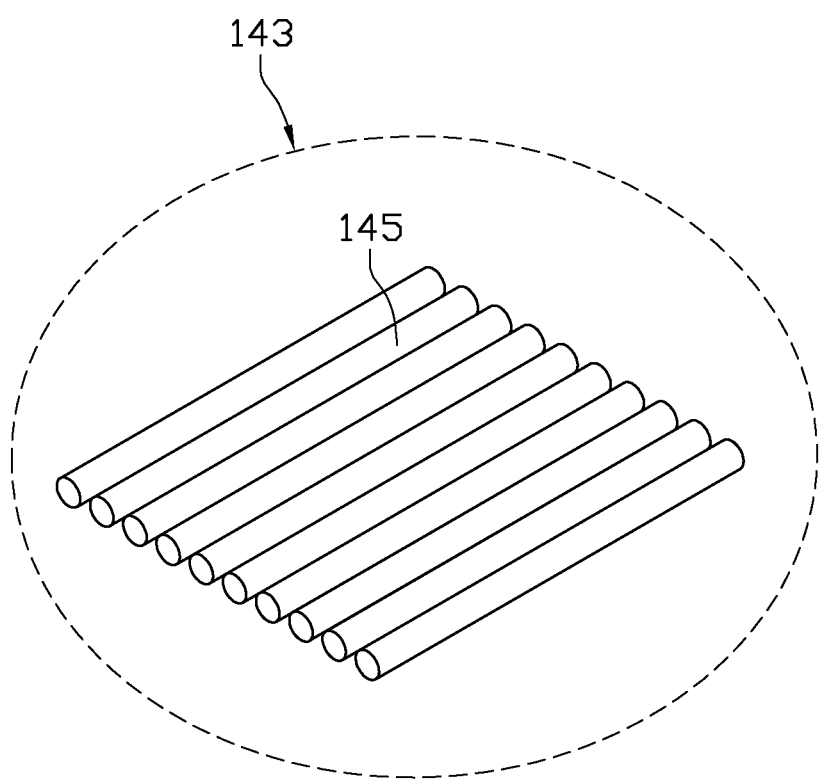
FIG. 8 is a schematic view of a carbon nanotube segment.
Figure 9:
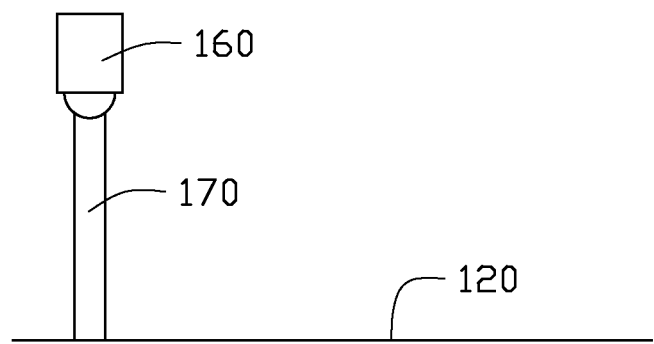
FIG. 9 is a schematic structural view of one embodiment of a method for fabricating a variable-density carbon nanotube film via laser.

More specifically, referring to FIG. 8, the drawn carbon nanotube film 120 includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and joined by Van der Waals attractive force therebetween. The carbon nanotube segments 143 can vary in width, thickness, uniformity and shape. The carbon nanotubes 145 in the carbon nanotube segments 143 are also substantially oriented along a preferred orientation.

Figure 10:
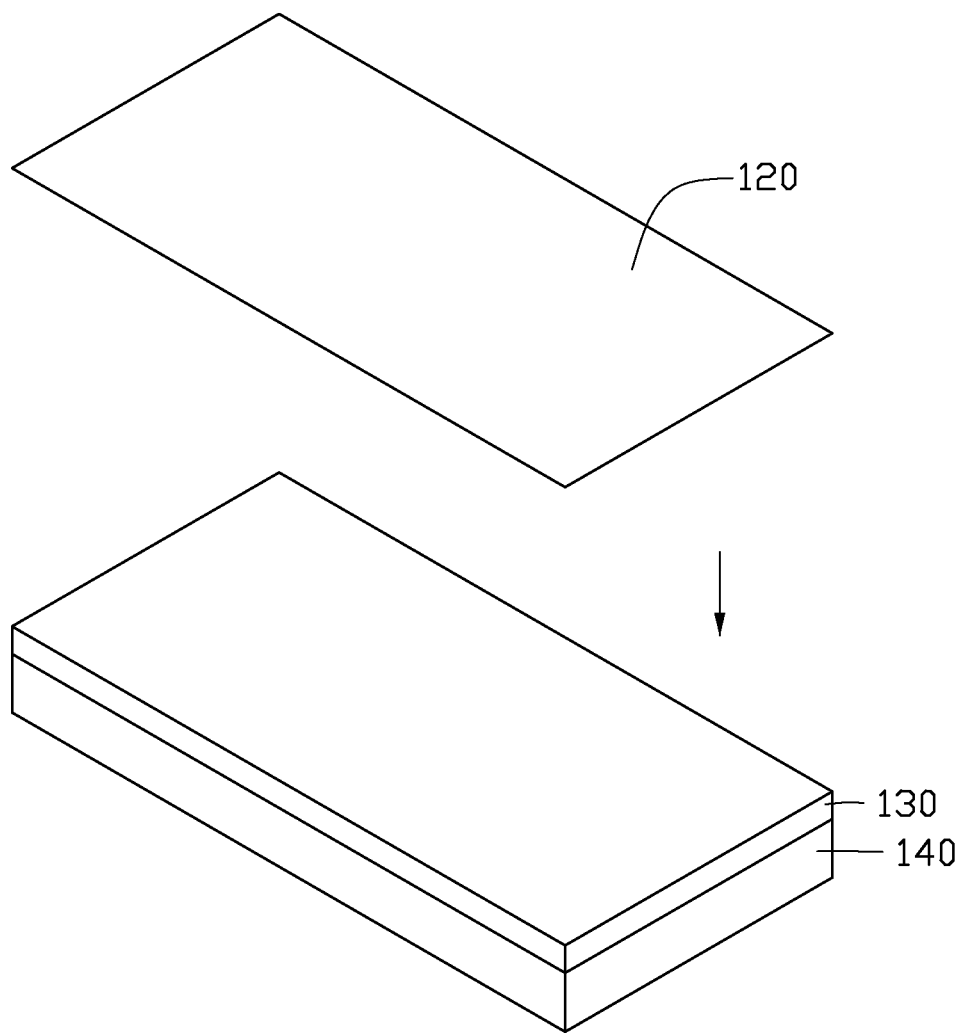
FIG. 10 is a schematic drawing that illustrates one embodiment of a process of putting the drawn carbon nanotube film on a substrate.

Referring to FIG. 10, in one embodiment, step (a) can further include a step of putting the drawn carbon nanotube film 120 on a substrate 140 after the step (a-2). Because the carbon nanotubes in the super-aligned array of carbon nanotubes have a high purity and a high specific surface area, the drawn carbon nanotube film 120 can be adhesive. As such, the drawn carbon nanotube film 120 can be adhered to the surface of the substrate 140 directly, in some embodiments.

Further, the substrate 140 can be transparent or opaque. The substrate 140 can be made of glass, quartz, plastic or resin. In one embodiment, the substrate 140 can be made of polyethylene terephthalate (PET). In one embodiment, a layer of adhesives 130 can be coated on one surface of the substrate 140 to secure the drawn carbon nanotube film 120 on the substrate 140. The layer of adhesives 130 can be pressure sensitive adhesives, thermo-sensitive adhesives, or photosensitive adhesive. In one embodiment, the layer of adhesives 130 can comprise butyl acrylate, 2-ethylhexyl acrylate, vinyl acetate, glycidyl methacrylate, acrylic acid, benzoperoxide, or a mixture of toluol and ethyl acetate.

As described above, the drawn carbon nanotube film 120 can be formed by step (a). However, the light transmittance of the drawn carbon nanotube film 120 is low, usually below 75%. The drawn carbon nanotube film 120 produced in such manner tends to have a number of large size or thickness carbon nanotube segments. This may be because, in step (a-21) the carbon nanotube segments are selected by using an adhesive tape to contact the carbon nanotube array 150, and it is difficult to control the size or thickness of the carbon nanotube segments which would be drawn out. As a result, the drawn carbon nanotube film 120 is formed by a plurality of carbon nanotube segments which have different sizes or thickness and are joined end-to-end. The large-diameter or size carbon nanotube segments may be the reasons why the light transmittance of the drawn carbon nanotube film 120 is low. The light transmittance of the drawn carbon nanotube film 120 can be improved through step (b).

Step (b) includes the sub-steps of:

(b-1) providing a laser device 160, which is used to produce a laser beam 170 irradiating on the drawn carbon nanotube film 120; and (b-2) forming the thin regions 126/426/526 in the drawn carbon nanotube film 120 by irradiating the drawn carbon nanotube film 120 with the laser beam 170 generated by the laser device 160.

In step (b-1), the laser device 160 can be an argon ion laser or a carbon dioxide laser. In one embodiment, the laser device 160 can have a power of approximately 12 watts. The laser beam 170 can be a pulse laser having a power of approximately 1 to 100 watts.

Figure 11:
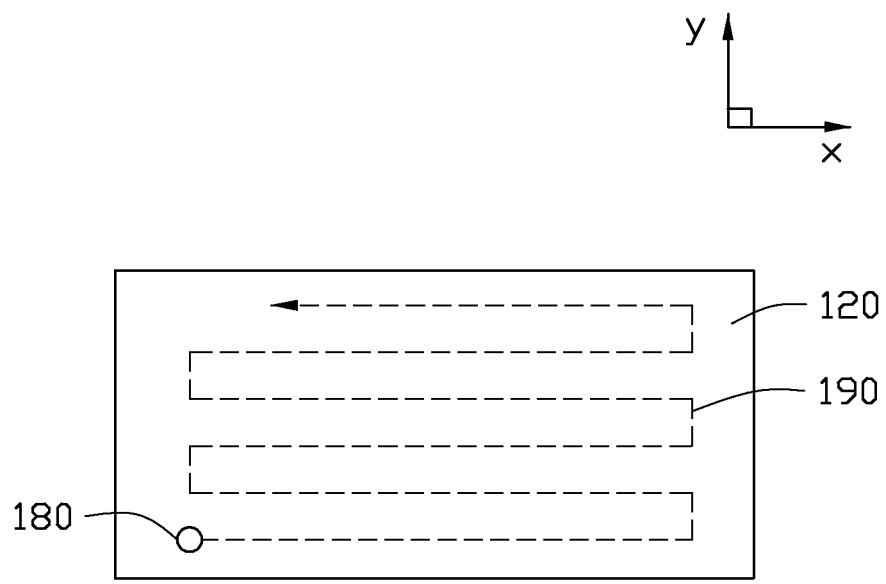
FIG. 11 shows a path of a laser spot on the drawn carbon nanotube film.

Referring to FIG. 11, if the laser beam 170 is irradiated on the drawn carbon nanotube film 120, a laser spot 180 can be formed on the drawn carbon nanotube film 120. The laser spot 180 can be round in shape and have a diameter ranging from about 1 micrometer to about 5 millimeters (e.g. about 20 micrometers). It is noteworthy that the laser beam 170 can be focused by a lens. It is also noteworthy that a number of laser devices can be adopted to adjust the shape of the laser spot 180. In one embodiment, the laser spot 180 can have a strip shape having a width ranging from about 1 micrometer to about 5 millimeters (about 20 micrometers).

In step (b-2), the drawn carbon nanotube film 120 and/or the laser beam 170 are controlled to move relative to each other so that the laser spot 180 moves relative to the drawn carbon nanotube film 120 along the first direction X to form the thin regions 126/426/526 in the drawn carbon nanotube film 120 along the first direction X.

In one embodiment, the drawn carbon nanotube film 120 can be fixed, and the laser device 160 can be moved to irradiate selected portions of the drawn carbon nanotube film 120. In another embodiment, the laser beam 170 can be fixed, and the drawn carbon nanotube film 120 can be moved relative to the laser beam 170 so that selected portions of the drawn carbon nanotube film 120 can be irradiated by the laser beam 170. In one embodiment, the drawn carbon nanotube film 120 and the laser device 160 can be fixed, the emergence angle of the laser beam 170 can be adjusted to cause the laser beam 170 moving relative to the drawn carbon nanotube film 120, so that the laser spot 180 can be projected on the selected portions of the drawn carbon nanotube film 120.

If the relative velocity between the drawn carbon nanotube film 120 and the laser beam 170 is large enough, a number of pulse laser beams 170 generated by the laser device 160 can irradiate spaced portions of the drawn carbon nanotube film 120. Then, a number of spaced thin regions 126 shown in FIG. 1 and FIG. 3 can be formed. If the relative velocity between the drawn carbon nanotube film 120 and the laser beam 170 is smaller than the product of the diameter of the laser spot 180 and the pulse rate of the laser beam 170, then portions of the drawn carbon nanotube film 120 irradiated by a number of pulse laser beams 170 can connect or overlap with each other. As a result, the thin regions 426 shown in FIG. 4 and the thin regions 526 shown in FIG. 5 can be formed.

Further, during the process of forming a number of rows 124, the drawn carbon nanotube film 120 can be moved relative to the laser beam 170 along the second direction Y after one row 124 has been formed. Then another row 124 can then be formed in the manner described above. Alternatively, after one row 124 has been formed, the laser beam 170 can be moved relative to the drawn carbon nanotube film 120 along the second direction Y. Then, another row 124 can then be formed in the manner described above. In one embodiment shown in FIG. 11, a path 190 of the laser spot 180 on the drawn carbon nanotube film 120 can be a snake-shaped path.

Step (b) can be carried out in the environment with oxygen, for example, in the air, so that some carbon nanotubes in the irradiated portions absorb the laser beam energy, to react with the oxygen in the air and then decompose. Thus, some carbon nanotubes in the irradiated portions will be removed. In this process, large size or thickness carbon nanotube segments in the irradiated portions tend to absorb more heat and burn out. As a result, the density of the irradiated portions is reduced and the thin regions 126/426/526 are formed.

Further, if the drawn carbon nanotube film 120 is suspended in the air by frames or supports or other structures during the process of forming the thin regions 126/426/526, the method can further include a step (c) of disposing the drawn carbon nanotube film 120 having the thin regions 126/426/526 on a surface of the substrate 140 after the step (b). The drawn carbon nanotube film 120 having the thin regions 126/426/526 can be adhered to the surface of the substrate 140 directly via its stickiness. Alternatively, a layer of adhesives 130 can be coated on one surface of the substrate 140 to secure the drawn carbon nanotube film 120 having the thin regions 126/426/526 on the substrate 140.

Alternatively, a solution of insulating polymer material can be first coated on one surface of the substrate 140, the drawn carbon nanotube film 120 having the thin regions 126/426/526 is then disposed on the surface of the substrate 140. Then, the solution of insulating polymer material will permeate into the drawn carbon nanotube film 120 having the thin regions 126/426/526. Finally, the insulating polymer material can be solidified and combined with the drawn carbon nanotube film 120 having the thin regions 126/426/526 to form a composite carbon nanotube film. The solidified insulating polymer material can also function as the adhesives 130 to secure the drawn carbon nanotube film 120 having the thin regions 126/426/526 on the substrate 140. The insulating polymer material includes polystyrene, polythene (PE), polycarbonate, polymethyl methacrylate (PMMA), ethylene glycol terephthalate (PET), benzocyclobutene (BCB), and cyclic olefin polymer.

According to the above descriptions, because the thin regions have a density less than that of the normal region, the light transmittance of the thin regions can be about 10% to 20% greater than that of the normal region. In one embodiment, the light transmittance of the thin regions can be increased from about 75% to more than 85% after being treated by the laser beam 170. Thus, the light transmittance of the whole variable-density carbon nanotube film can be improved.

In order to illustrate the advantage of the variable-density carbon nanotube film 100, two tests have been run on some embodiments. In the two tests, the laser beam 170 has a power of approximately 3.6 watts. The pulse rate of the laser beam 170 is about 100 kHz. Both of the length and the width of the drawn carbon nanotube film 120 are about 30 millimeters. Other parameters and results of the tests are detailed in table 1 below:

TABLE 1

| Plot | Relative velocity between the drawn carbon nanotube film and the laser beam | Distance $d_2$ | Square resistance in the first direction X | Square resistance in the second direction Y | Light transmittance of the carbon nanotube film having thin regions |
|---|---|---|---|---|---|
| 1 | 2000 mm/s | 0.04 mm | 3 kΩ | 270 kΩ | 85% |
| 2 | 500 mm/s | 0.08 mm | 1.9 kΩ | 560 kΩ | 95% |

It is clear from the table 1 that the light transmittance of the drawn carbon nanotube film having thin regions can reach to about 85% to about 95%, and the square resistance of the variable-density carbon nanotube film 100 in the first direction X is much less than that in the second direction Y.

In some embodiments, step (b) and step (a) can be synchronously carried out by using a laser beam to irradiate a drawn carbon nanotube film at the time the drawn carbon nanotube film is drawn out.

Figure 12:
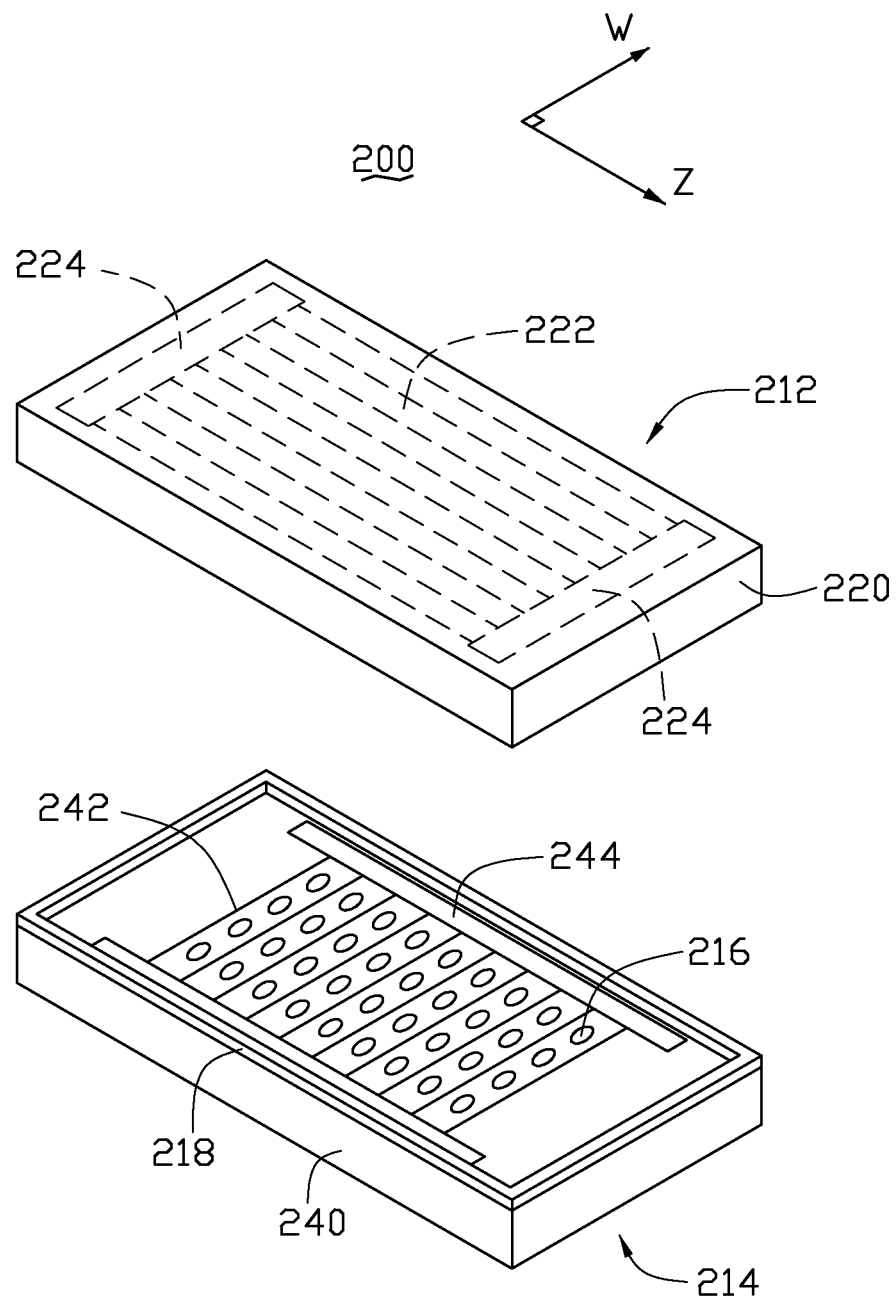
FIG. 12 is an exploded, isometric view of one embodiment of a touch panel.
Figure 13:
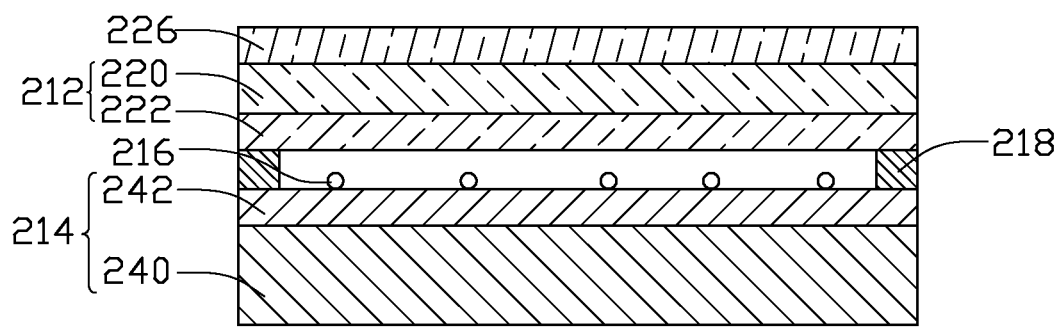
FIG. 13 is a cross-section of the assembled touch panel of FIG. 12.

Referring to FIG. 12 and FIG. 13, one embodiment of a resistive touch panel 200 includes a first electrode plate 212, a second electrode plate 214, and a number of transparent dot spacers 216 disposed between the first electrode plate 212 and the second electrode plate 214.

The first electrode plate 212 includes a first substrate 220, a first conductive layer 222, and two first electrodes 224. The first substrate 220 is substantially flat. The first conductive layer 222 and the two first electrodes 224 are located on a lower surface of the first substrate 220. The two first electrodes 224 are located separately on opposite ends of the first conductive layer 222 along a third direction Z as shown in FIG. 12. The two first electrodes 224 are electrically connected to the first conductive layer 222.

The second electrode plate 214 includes a second substrate 240, a second conductive layer 242, and two second electrodes 244. The second substrate 240 is substantially flat. The second conductive layer 242 and the two second electrodes 244 are located on a top surface of the second substrate 240. The two second electrodes 244 are located separately on opposite ends of the second conductive layer 242 along a fourth direction W as shown in FIG. 12. The two second electrodes 244 are electrically connected to the second conductive layer 242. The second conductive layer 242 and the two second electrodes 244 are opposite to and spaced apart from the first conductive layer 222 and the two first electrodes 224. The two second electrodes 244 are orthogonal to the two first electrodes 224.

The first substrate 220 is a transparent and flexible film/plate made of polymer, resin, or any other flexible material. The second substrate 240 is a transparent board made of glass, diamond, quartz, plastic or any other suitable material. The second substrate 240 can be made of flexible material. The flexible material can be polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, or acrylic resins. The thickness of each of the first substrate 220 and the second substrate 240 can range from about 1 millimeter to about 1 centimeter. In one embodiment, each of the first substrate 220 and the second substrate 240 is made of PET, and has a thickness of about 2 millimeters.

At least one of the first conductive layer 222 and the second conductive layer 242 can be or can include the variable-density carbon nanotube film 100/400/500 described above. For clarification purposes, the variable-density carbon nanotube film 100 will be taken as an example to illustrate how to arrange the variable-density carbon nanotube film 100/400/500 in the touch panel 200. If one of the first conductive layer 222 and the second conductive layer 242 is a variable-density carbon nanotube film 100, the other can be an indium tin oxides (ITO) layer or an antimony tin oxide (ATO) layer.

If the first conductive layer 222 can be or can include the variable-density carbon nanotube film 100, the variable-density carbon nanotube film 100 can be disposed on the first substrate 220 with the rows 124 extending along the third direction Z. In other words, the variable-density carbon nanotube film 100 can be disposed on the first substrate 220 with the first direction X being parallel to the third direction Z.

If the second conductive layer 242 can be or can include the variable-density carbon nanotube film 100, the variable-density carbon nanotube film 100 can be disposed on the second substrate 240 with the rows 124 extending along the fourth direction W. In other words, the variable-density carbon nanotube film 100 can be disposed on the second substrate 240 with the first direction X being parallel to the fourth direction W.

In one embodiment shown in FIG. 12, each of the first conductive layer 222 and the second conductive layer 242 can be or can include the variable-density carbon nanotube film 100. In the variable-density carbon nanotube film 100 of the first conductive layer 222, the thin regions 126 are arranged in the form of a number of rows 124 extending along a direction from one of the two first electrodes 224 to the other, which is the third direction Z. In the variable-density carbon nanotube film 100 of the second conductive layer 242, the thin regions 126 are arranged in the form of a number of rows 124 extending along a direction from one of the two second electrodes 244 to the other, which is the fourth direction W.

In some embodiments, at least one of the first conductive layer 222 and the second conductive layer 242 can be a composite carbon nanotube film comprising one of the variable-density carbon nanotube film 100/400/500 and insulating polymer material in a manner described above. The insulating polymer material can include polystyrene, polythene (PE), polycarbonate, polymethyl methacrylate (PMMA), ethylene glycol terephthalate (PET), benzocyclobutene (BCB), and cyclic olefin polymer.

The first electrodes 224 and the second electrodes 244 can be made of electrically conductive materials, such as metal or carbon nanotubes. The first electrodes 224 and the second electrodes 244 can be directly formed respectively on the first conductive layer 222 and the second conductive layer 242, by sputtering, electroplating, or chemical plating. Alternatively, the first electrodes 224 and the second electrodes 244 can be respectively adhered to the first conductive layer 222 and the second conductive layer 242, with conductive adhesives. It is noted that the first electrodes 224 can be disposed between the first substrate 220 and the first conductive layer 222, or be disposed on the first substrate 220.

Further, the touch panel 200 can include an insulating layer 218 disposed on the second electrode plate 214 around the periphery of the second electrode plate 214. The first electrode plate 212 is disposed on the insulating layer 218. The insulating layer 218 separates the first electrode plate 212 from the second electrode plate 214. A distance between the second electrode plate 214 and the first electrode plate 212 can be in an range from about 2 microns to about 20 microns.

The dot spacers 216 and the insulating layer 218 are disposed between the first electrode plate 212 and the second electrode plate 214. The dot spacers 216 are separately located on the second conductive layer 242. The insulating layer 218 and the dot spacers 216 can be made of, for example, insulating resin or any other suitable insulating material. Insulation between the first electrode plate 212 and the second electrode plate 214 is provided by the insulating layer 218 and the dot spacers 216. It is to be understood that the dot spacers 216 are optional, particularly when the touch panel 200 is relatively small. They serve as supports given the size of the span and the strength of the first electrode plate 212.

The touch panel 200 can further include a transparent protective film 226 disposed on a surface of the first electrode plate 212. The material of the transparent protective film 226 can be silicon nitride, silicon dioxide, BCB, polyester, acrylic resin, PET, or any combination thereof. The transparent protective film 226 can also be a plastic film with surface hardening treatment in use. The transparent protective film 226 can reduce glare, or reflection. In one embodiment, the material of the transparent protective film 226 is PET.

Because the variable-density carbon nanotube film 100 has high light transmittance due to the thin regions 126, the touch panel 200 using the variable-density carbon nanotube film 100 can also have high light transmittance.

Figure 14:
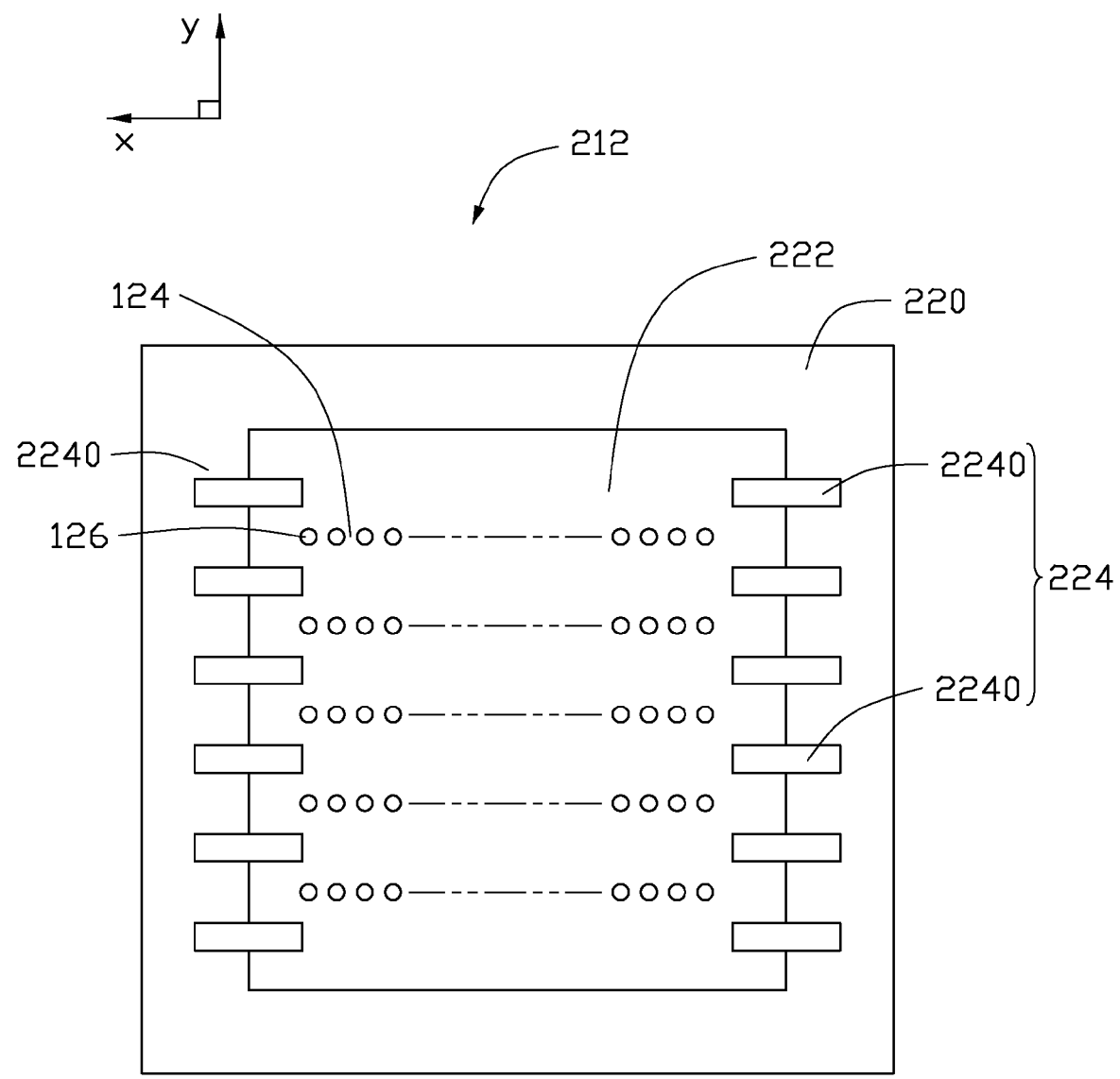
FIG. 14 shows a schematic top view of one embodiment of a touch panel.

In some embodiments, each of the first electrodes 224 and the second electrodes 244 can be divided into a number of sub-electrodes. For clarification purposes, the first electrodes 224 will be taken as an example to illustrate how to arrange the sub-electrodes. As shown in FIG. 14, each of the two first electrodes 224 includes a number of spaced sub-electrodes 2240. The sub-electrodes 2240 located at one side of the first conductive layer 222 align with the sub-electrodes 2240 located at an opposite side of the first conductive layer 222 in a one to one manner, to form a number of pairs of sub-electrodes 2240. Each of the second electrodes 244 can have the same or a similar structure as that of the first electrodes 224. The touch panel 200 using the sub-electrodes 2240 can have multi-touch-function. Further, each of the rows 124 can be arranged between adjacent two sub-electrodes 2240, to avoid increasing the resistance between each pair of sub-electrodes 2240.

Figure 15:
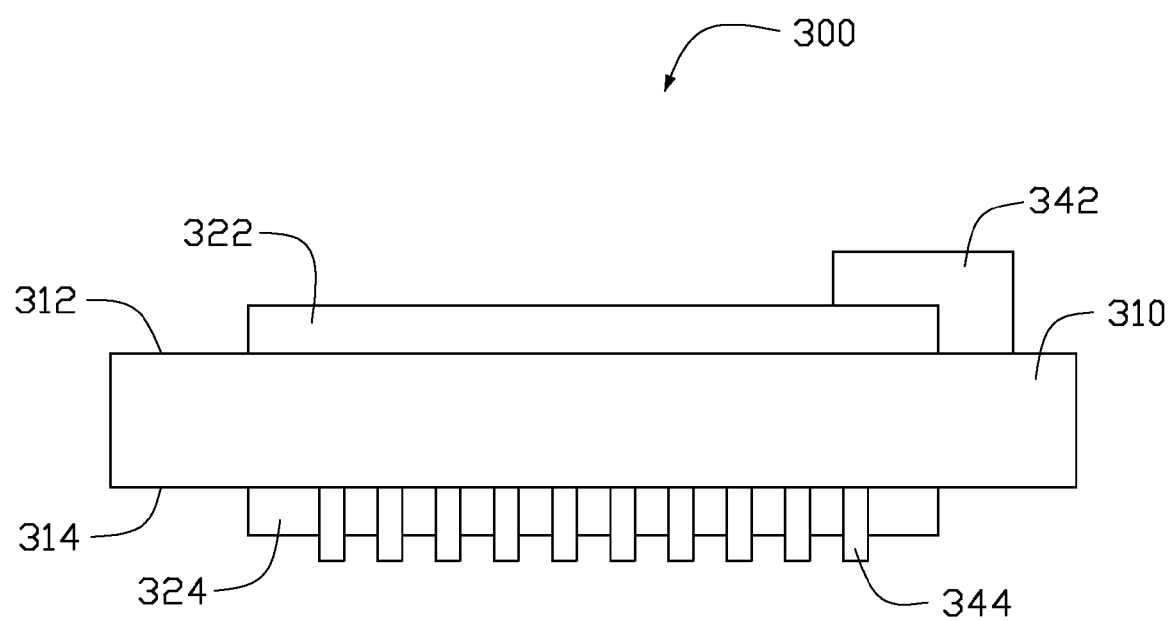
FIG. 15 is a schematic, side view of another embodiment of a touch panel.
Figure 16:
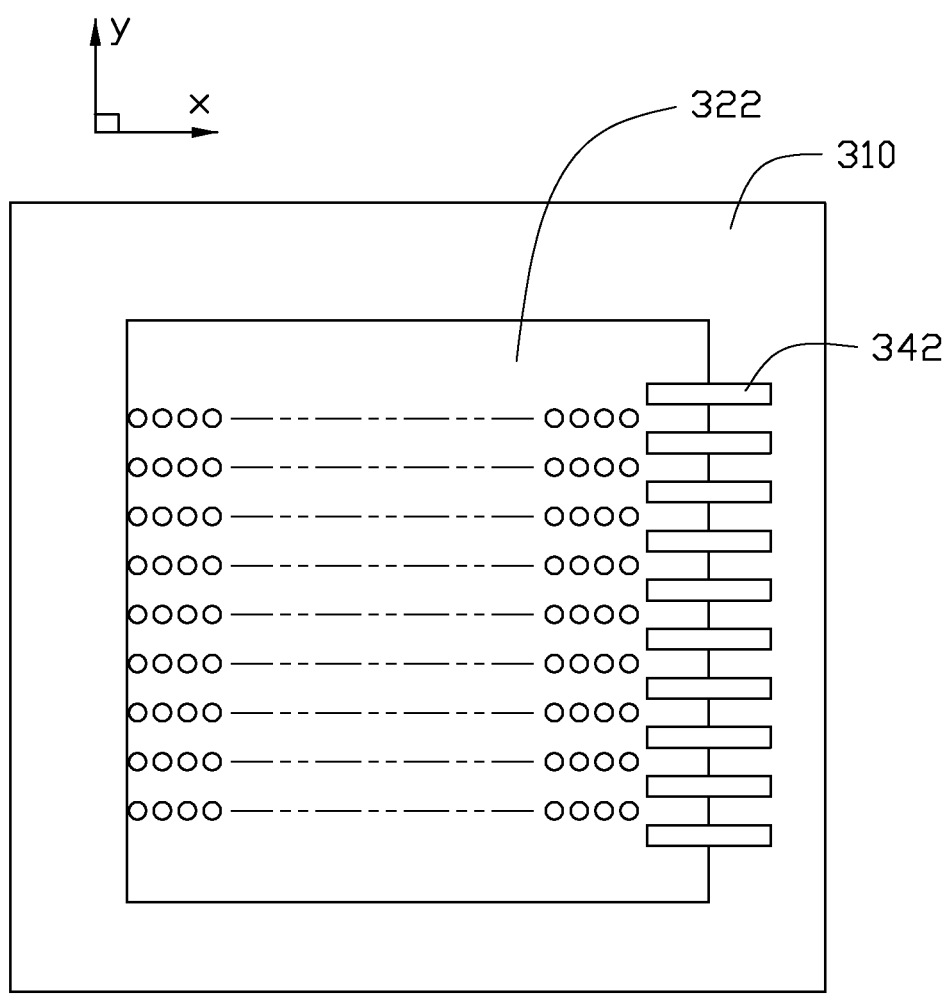
FIG. 16 shows a top view of the touch panel of FIG. 15.
Figure 17:
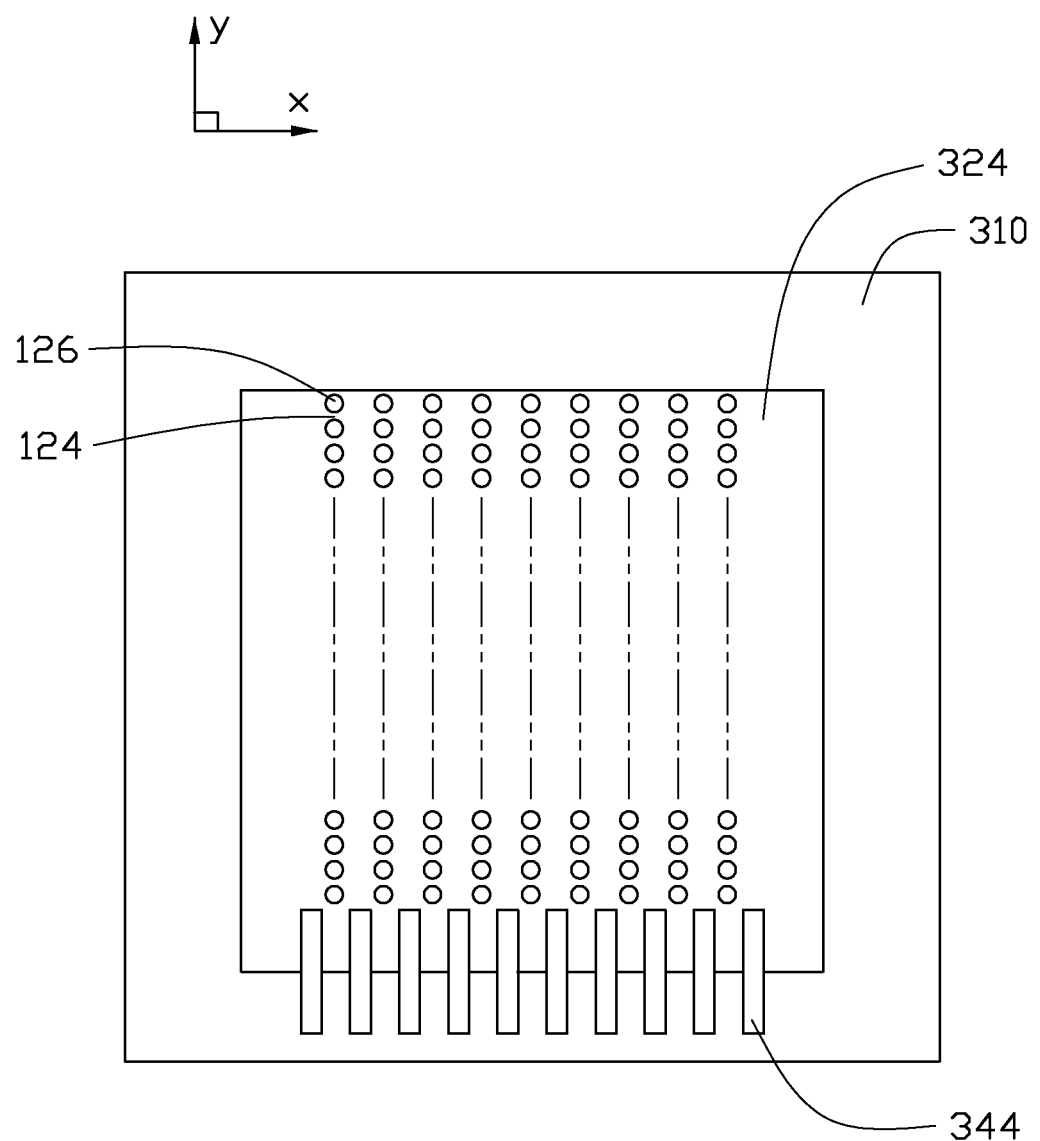
FIG. 17 shows a bottom view of the touch panel of FIG. 15.

Referring to FIGS. 15-17, one embodiment of a capacitive touch panel 300 includes a substrate 310, a first conductive layer 322, a second conductive layer 324, a number of first electrodes 342 and a number of second electrodes 344. The substrate 310 includes a first surface 312 and an opposite second surface 314. The first conductive layer 322 and the first electrodes 342 are disposed on the first surface 312. The second conductive layer 324 and the second electrodes 344 are disposed on the second surface 314.

At least one of the first conductive layer 322 and the second conductive layer 324 can be or can include the variable-density carbon nanotube film 100/400/500 described above. For clarification purposes, the variable-density carbon nanotube film 100 will be taken as an example to illustrate how to arrange the variable-density carbon nanotube film 100/400/500 in the touch panel 300.

In the embodiment shown in FIGS. 15-17, each of the first conductive layer 322 and the second conductive layer 324 can include the variable-density carbon nanotube film 100. In the variable-density carbon nanotube film 100 of the first conductive layer 322, as shown in FIG. 16, the thin regions 126 are arranged in the form of a number of rows 124 extending along the aligned direction of the carbon nanotubes of the variable-density carbon nanotube film 100 of the first conductive layer 322. The first electrodes 342 are spaced and arranged in a column extending along a direction substantially perpendicular to the aligned direction of the carbon nanotubes of the variable-density carbon nanotube film 100 of the first conductive layer 322.

In the variable-density carbon nanotube film 100 of the second conductive layer 324, as shown in FIG. 17, the thin regions 126 are arranged in the form of a number of rows 124 extending along the aligned direction of the carbon nanotubes of the variable-density carbon nanotube film 100 of the second conductive layer 324. The second electrodes 344 are spaced and arranged in a column extending along a direction substantially perpendicular to the aligned direction of the carbon nanotubes of the variable-density carbon nanotube film 100 of the second conductive layer 324. The aligned direction of the carbon nanotubes of the variable-density carbon nanotube film 100 of the second conductive layer 324 is substantially perpendicular to the aligned direction of the carbon nanotubes of the variable-density carbon nanotube film 100 of the first conductive layer 322. In other words, the rows 124 of the first conductive layer 322 extend along a direction substantially perpendicular to a direction, in which the rows 124 of the second conductive layer 324 extend along.

In some embodiments, the first conductive layer 322 or the second conductive layer 324 can include a number of variable-density carbon nanotube films 100 stacked or not, disposed side by side, and the aligned directions of the carbon nanotubes of the variable-density carbon nanotube films 100 are substantially the same. In some embodiments, the first conductive layer 322 or the second conductive layer 324 can include a composite carbon nanotube film as described above.

The substrate 310 can be the same or similar to the first substrate 220. The first electrodes 342 and the second electrodes 344 can be the same or similar to the first electrodes 224 and the second electrodes 244.

Because the variable-density carbon nanotube film 100 exhibits relatively high anisotropic electrical conductivity, each portion of the first conductive layer 322 contacting one of the first electrodes 342 can be equal to a conductive band. Similarly, the second conductive layer 324 can also be equal to a number of conductive bands. The conductive bands of the first conductive layer 322 are substantially perpendicular to the conductive bands of the second conductive layer 324. Thus, a number of capacitances are formed at the cross parts of the conductive bands of the first conductive layer 322 and the second conductive layer 324. In operation of the touch panel 300, one or more contacts can be made with the touch panel 300 from one or more contact tools (not shown), such as fingers or stylus, capacitances of the contact points will change and can be detected by external circuits. The coordinates of the contact points on the touch panel 300 can be obtained.

Figure 18:
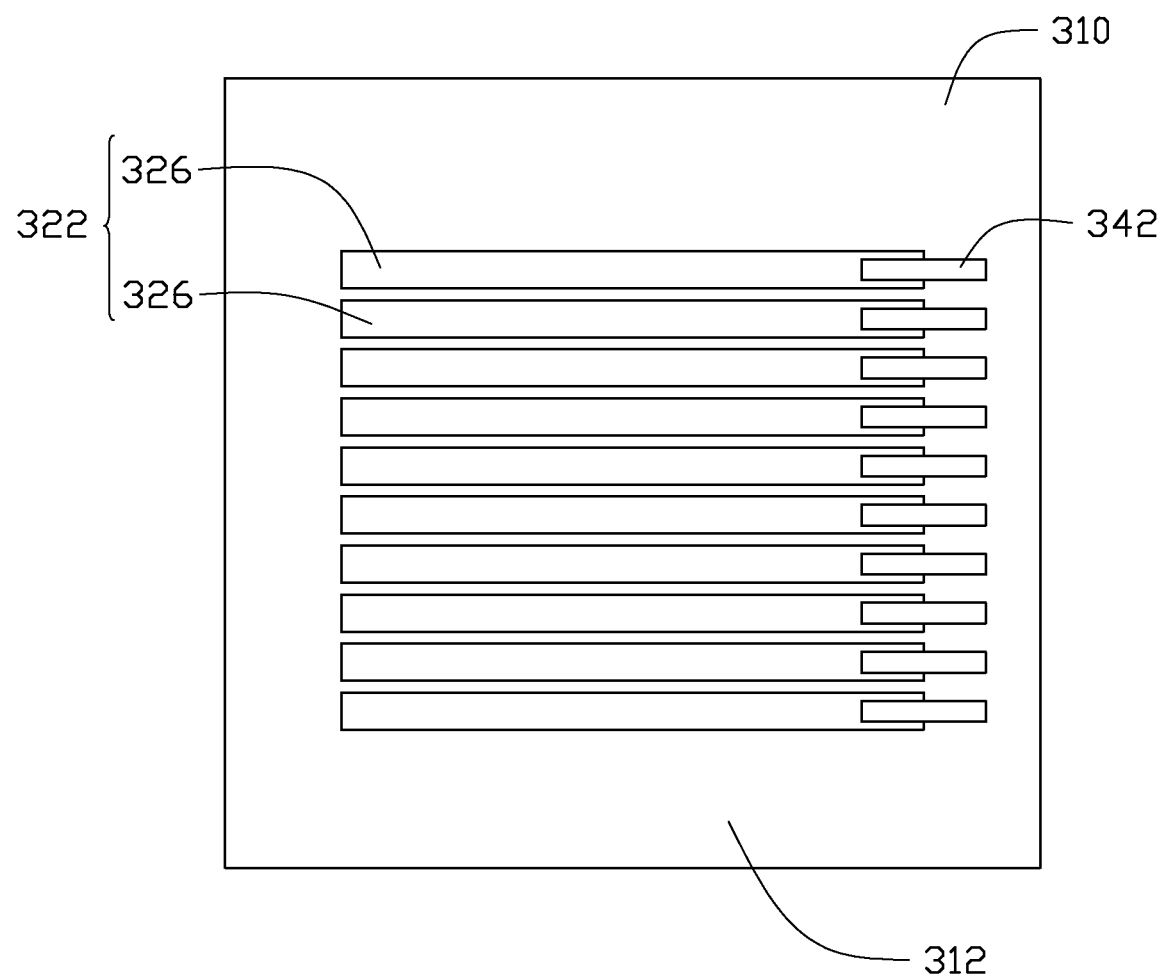
FIG. 18 shows a schematic top view of another embodiment of a touch panel.

In one embodiment shown in FIG. 18, the first conductive layer 322 can be a number of substantially parallel and spaced long ITO strips 326. The second conductive layer 324 can include the variable-density carbon nanotube film 100. The ITO strips 326 can be arranged on the first surface 312 with the lengthwise directions thereof substantially perpendicular to the aligned direction of the carbon nanotubes of the variable-density carbon nanotube film 100 of the second conductive layer 324.

Similarly, the first conductive layer 322 can include the variable-density carbon nanotube film 100. The second conductive layer 324 can be a number of substantially parallel and spaced long ITO strips. The ITO strips can be arranged to be substantially perpendicular to the aligned direction of the carbon nanotubes of the variable-density carbon nanotube film 100 of the first conductive layer 322.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A touch panel comprising:
   a first electrode plate comprising a first conductive layer; and
   a second electrode plate, spaced from the first electrode plate, comprising a second conductive layer adjacent to the first conductive layer;
   wherein at least one of the first conductive layer and the second conductive layer comprises a carbon nanotube film, the carbon nanotube film comprises:
   a plurality of thin regions; and
   at least one normal region comprising a plurality of successively oriented carbon nanotubes joined end-to-end by Van der Waals attractive force therebetween, the carbon nanotubes are substantially aligned along an aligned direction;
   wherein the at least one normal region has a density of carbon nanotubes greater than that of the plurality of thin regions, and the plurality of thin regions are arranged along the aligned direction.

2. The touch panel of claim 1, wherein the at least one normal region separates the plurality of thin regions from each other.

3. The touch panel of claim 1, wherein the plurality of thin regions each have a density less than 50% of that of the at least one normal region.

4. The touch panel of claim 1, wherein the plurality of thin regions are openings.

5. The touch panel of claim 1, wherein the plurality of thin regions form a plurality of rows extending along the aligned direction, and the plurality of rows are spaced from one another in a direction perpendicular to the aligned direction.

6. The touch panel of claim 5, wherein at least one of the plurality of rows is defined by some of the plurality of thin regions that form in a line.

7. The touch panel of claim 5, wherein one of the plurality of thin regions has a long strip shape and extends across more than half the entire length of the carbon nanotube film.

8. The touch panel of claim 5, wherein each of the plurality of thin regions has a long strip shape and extends across more than half the entire length of the carbon nanotube film; and the plurality of thin regions are spaced from each other along the direction substantially perpendicular to the aligned direction.

9. The touch panel of claim 5, wherein the plurality of thin regions are round, the plurality of thin regions define an array.

10. The touch panel of claim 5, wherein the plurality of thin regions are round, and the thin regions in adjacent rows are in a staggered formation.

11. The touch panel of claim 1, wherein each of the first conductive layer and the second conductive layer comprises the carbon nanotube film; the aligned direction of the carbon nanotubes of the first conductive layer is perpendicular to the aligned direction of the carbon nanotubes of the second conductive layer.

12. The touch panel of claim 11, further comprising two first groups of first electrodes located at opposite sides of the first conductive layer and two second groups of second electrodes located at opposite sides of the second conductive layer; wherein in each of the first groups, the first electrodes are arranged along the aligned direction of the carbon nanotubes of the second conductive layer; and wherein in each of the second groups, the second electrodes are spaced arranged along the aligned direction of the first conductive layer.

13. The touch panel of claim 12, wherein the first electrodes located on a first side of the first conductive layer align with the first electrodes located on a second side of the first conductive layer in a one to one manner.

14. The touch panel of claim 13, wherein the plurality of thin regions of the first conductive layer form a plurality of rows, each located between adjacent two first electrodes located on a same side of the first conductive layer; and the plurality of thin regions of the second conductive layer form a plurality of rows, each located between adjacent two second electrodes located on a same side of the second conductive layer.

15. A touch panel comprising:
a substrate having a first surface and a second surface that is opposite to the first surface;
a plurality of first conductive bonds, wherein the plurality of first conductive bonds are parallel and disposed on the first surface, each of the plurality of first conductive bonds comprises a first electrode and a first conductive path, formed of a plurality of carbon nanotubes substantially aligned in a first direction, the first electrode is electrically connected to the first conductive path, and the first conductive path has low and high densities of carbon nanotubes;
a plurality of second conductive bonds, wherein the plurality of second conductive bonds are parallel and disposed on the second surface, each of the plurality of second conductive bonds comprises a second electrode and a second conductive path extending along a second direction, and the second conductive path is electrically connected to the second electrode.

16. The touch panel of claim 15, wherein the first conductive path has low and high densities of carbon nanotubes alternating along the first direction.

17. The touch panel of claim 16, wherein adjacent first conductive paths are connected to each other by Van der Waals attractive force.

18. The touch panel of claim 15, wherein each of the plurality of second conductive bonds is an ITO layer, and the ITO layers are spaced from each other in the first direction.

19. The touch panel of claim 15, wherein the first direction is perpendicular to the second direction.

20. The touch panel of claim 19, wherein the plurality of second conductive bonds are different portions of a continuous carbon nanotube film comprising a plurality of successively oriented carbon nanotubes joined end-to-end by Van der Waals attractive force therebetween, wherein the carbon nanotubes of the continuous carbon nanotube film are substantially aligned along the second direction.

* * * * *